Jan. 8, 1935.  S. GIMPLIN  1,987,102
MAKE-UP FRAME FOR NEWSPAPERS
Filed Nov. 16, 1931
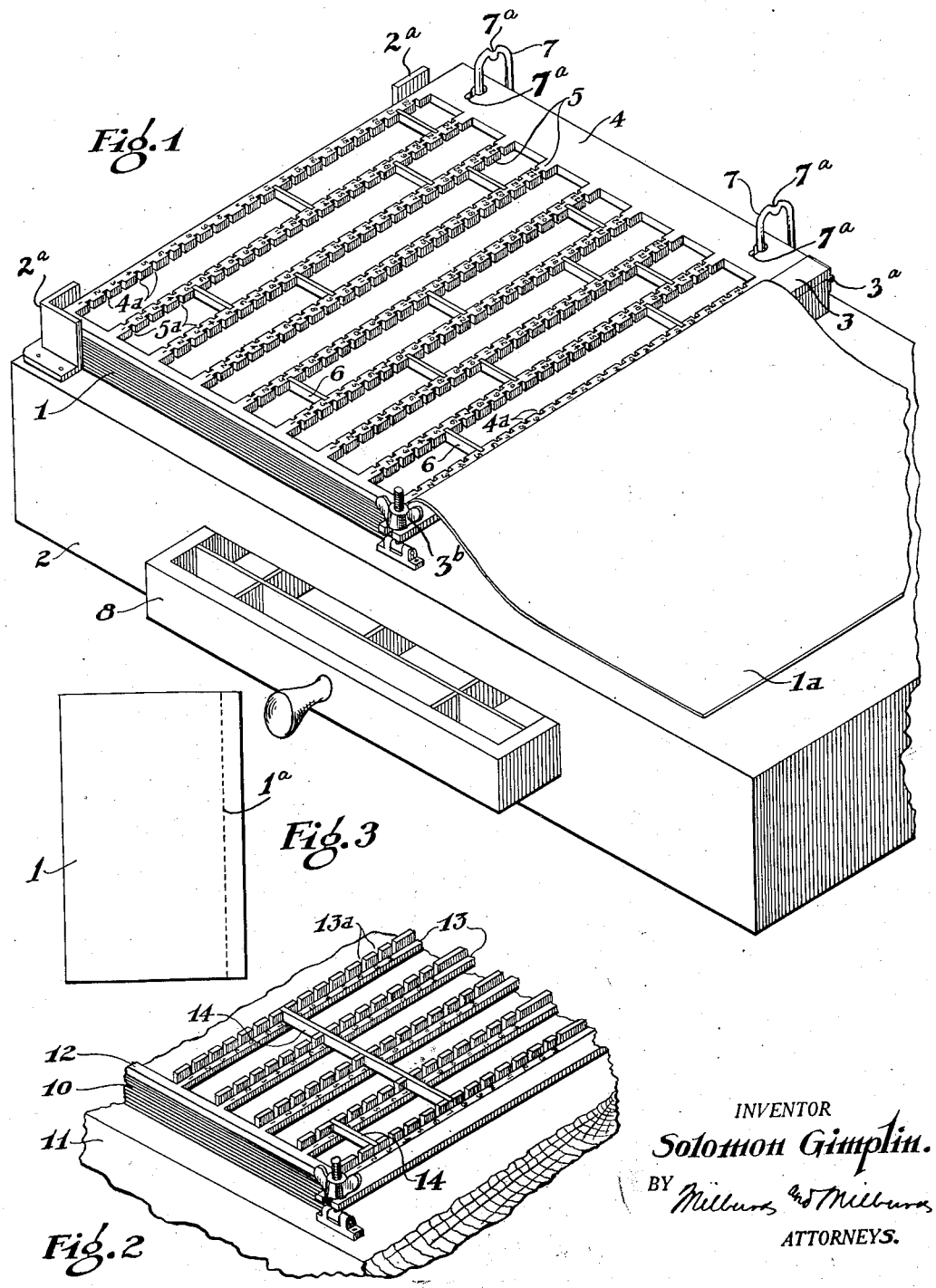
INVENTOR
Solomon Gimplin.
BY
ATTORNEYS.

Patented Jan. 8, 1935

1,987,102

UNITED STATES PATENT OFFICE 1,987,102

MAKE-UP FRAME FOR NEWSPAPERS

Solomon Gimplin, Cleveland, Ohio

Application November 16, 1931, Serial No. 575,438

7 Claims. (Cl. 33—184.5)

This invention relates to the art of making up newspaper sheets with advertising and news material and involves more especially the employment of a make-up frame which is adapted to facilitate this work.

Heretofore, in making up the advertisement and news sections of a newspaper, in order to arrive at a proper arrangement and balance of the space for this subject matter, it has been the usual practice to indicate with pencil upon a trial sheet in each case, the particular spaces to be devoted to various advertisements or news items, as the case might be. That is, in the advertising department, this practice would be followed with respect to its subject matter and the same practice would be followed in the news department. It has also been part of the practice for the advertising department to first lay out its subject matter upon the given sheet and to then deliver such sheet with the indications of advertising matter thereupon to the news department where this sheet is employed as a guide in making up the complete form of sheet, including both advertising and news subject matter.

However, in the old form of practice as above briefly outlined, it has been necessary in making up the trial sheets, to erase the pencil marks from time to time before there would be obtained a satisfactory arrangement and balance. This has been true with respect to both the advertising and news sheets and the expenditure of such unnecessary time and labor has been considered a serious draw-back to the old system.

It is therefore the object of the present invention to devise a means whereby the proper arrangement and balance of both advertising and news can be obtained upon the regular form of sheet without the inconvenience as well as loss of time and labor incident to the old system, as above referred to.

Other objects will appear from the following description and claims when considered together with the accompanying drawing.

Fig. 1 is a perspective view illustrating my improved form of device as applied to the make-up for a news sheet; Fig. 2 is a perspective view illustrating my particular form of improved make-up frame adapted especially for use in connection with advertisements; and Fig. 3 illustrates a trial sheet with a scored line.

It is to be understood that the present disclosure is merely for purposes of illustration and that there may be devised various modifications without departing from the spirit of the present invention as herein set forth and claimed.

According to the old practice referred to above, the test sheets for the news items have been of a considerably smaller size than those for the advertising subject matter. This same practice may still be followed in the use of the present device, although the relative size of the sheets for these two classes of subject matter is immaterial so far as the present invention is concerned. The make-up frame to be now described may be of any size desired and the frames used for the news and advertising departments may be either of the same size or different sizes.

According to the present invention, the stack of test or trial sheets 1 will be placed upon any suitable support, as for instance, the board 2 which may rest upon a table, and may be fastened together in any suitable manner so as to permit the top sheet to be turned back after it has received its indications as to the arrangement of subject matter thereupon. The sheets 1 will engage the members 2ª so as to properly position the same. In the present illustration, there is shown the releasable fastener strip 3 which is hinged at 3ª and clamped at 3ᵇ so that the sheets 1 may be turned in succession so as to then occupy position indicated by 1ª upon the table. Any other suitable hinge or clamping or hinge means may be employed. If so desired, the means for hinging the sheets together may be entirely removable from the board, together with the complete stock of sheets. In any event, all of the sheets 1 or any number of them, may be removed from the make-up device in the one department and transferred to the other department. Although the sheets are here shown as being turned to the right, the arrangement may be reversed so as to turn them to the left.

The make-up frame as here disclosed, is a rectangular form of substantially the same size as the test sheet in any given case, except that upon the one side of the make-up frame, there is allowed sufficient space for the hinge connection of the sheets 1 in the manner above explained. The make-up frame which is indicated in a general way by reference numeral 4, is divided into the same number of columns as appear upon the standard news sheet which in the present case, are eight in number. It is to be understood that any number of column divisions in the frame may be employed so that the present make-up frame may be adapted to any size of newspaper. These columns upon the make-up frame are formed by the dividing bars 5 which extend from the top to the bottom thereof and which may be formed integrally therewith.

Spaced at proper intervals along the two vertically disposed sides of the make-up frame 4 are the notches 4ª, while upon the two sides of the bars 5, there are provided the oppositely disposed notches 5ª for cooperation therewith. According to the usual custom of the present day newspaper, and the basis of their charge for subject matter, especially in the advertising department, these notches will be spaced approximately one inch apart, and these spaces numbered, as indicated, although there may be a modification of this particular detail, if so desired. The slugs 6 are adapted to be placed with their ends in the oppositely disposed notches 4ª and 5ª and also in the oppositely disposed notches 5ª between the bars 5 throughout the entire extent of the eight columns. These slugs are of identical form and may therefore be placed interchangeably at any position desired. The purpose of these slugs is to enable the one in charge of making up a test sheet to obtain an impression as to the appearance of the sheet with respect to the arrangement and balance of the several items intended for such sheet. Such impression may be obtained by first placing the slugs in the proper notches so as to thereby indicate the proper amount of space in the column for the particular item which is to occupy that particular part of the page. The slugs may be temporarily placed in such position and removed and replaced in other positions in the process of trying out the various possible arrangements of the news items upon the page so as to obtain the best possible balance. Then when such balance has been obtained, as indicated by the slugs in their various positions, these same slugs while occupying such positions, may be employed as straight edges for the drawing of pencil lines along the lower sides thereof so as to record upon the top sheet 1 which lies immediately below the make-up frame, the particular arrangement and balance which has been decided upon for this particular page. Within the spaces thus marked off in the various columns for the news items, there may be indicated the name or nature of these individual items.

Then having completed the indications upon the topmost sheet 1, the make-up frame 4 may be raised therefrom and turned back sufficiently to permit the topmost sheet 1 to be turned to the right about the hinges 3 so as to occupy position 1ª upon the board. For this purpose, the frame 4 is provided at its top with the inverted U-shaped form of hinge 7. This particular form of hinge is especially useful in this connection, since it permits the make-up frame 4 to be raised in the manner just explained and at the same time permits the frame 4 to settle in a perfectly flat horizontal manner upon the sheets 1, regardless of the number of sheets which remain in the stack. In this way, the placing and retaining of the slugs 6 in position and the marking of the pencil indications along the lower sides thereof are greatly facilitated. If so desired, there may be provided notches 7ª in the tops of the hinges 7 to engage the edges of the hinge openings in the top part of the frame 4 so that such interengagement between these parts will permit the frame 4 to be maintained in raised position while the operator is turning the topmost sheet 1 to position 1ª. Such interengagement between the hinge 7 and the hinge openings in the frame, is only temporary and may be readily released when it is desired to again lower the frame 4 to horizontal position. Sheets 1 may be scored at 1ª so as to permit ready removal of a sheet without disturbing the remaining sheets.

While the slugs 6 are not in use, they may be stored in the drawer 8 which is provided at a convenient part of the board with respect to the position of the make-up frame thereupon.

The make-up frame above described is intended for use in the news department. For this reason, the slugs are all of the same size since the news items are generally confined to the standard width of columns. However, in case of a news item requiring headlines of greater width than that of a single column, such may be indicated upon the test sheet by placing slugs at the same corresponding position in as many of the adjoining columns as required.

In the form of make-up frame herein devised for use in the advertising department, the sheets 10 are arranged in a stack as in the preceding case, and are adapted to be turned toward the right about the fastener or clamp at the edges thereof, so that the successive sheets may be brought to occupy a position upon the board 11 corresponding to that indicated by reference numeral 1ª in Fig. 1. Also, the make-up frame indicated in a general way by reference numeral 12 may be hinged at its top by means of the same inverted U-shaped form of hinge, as employed in connection with Fig. 1. In fact, the form of device illustrated in Fig. 2 is exactly the same as that already described, except for the possible difference in size, as above explained, and also the difference with respect to the size and manner of placing the slugs.

The space embraced by the make-up frame 12 is also divided into the usual number of columns by means of the vertically extending bars 13 which may be formed integrally with the frame. The bars in this particular form of device, however, are provided with the notches 13ª upon the top thereof, and are arranged exactly opposite to each other throughout the entire width of the make-up frame. These notches may also be spaced the same distance apart, as for instance one inch, according to the basis of charge for advertising material. In this form of device, which is contemplated for use in connection with various sizes of spaces to be given to different advertisements, I have adopted the slugs 14 of different lengths ranging from that corresponding to the width of a single column to that corresponding to the full width of the entire page, or in other words, of the entire make-up frame. Since the notches 13ª are, in the present form of device, provided upon the tops of the bars 13, the slugs may be placed in position so as to extend across any desired number of the bars 13 and thereby cover any desired number of columns according to the size of the space desired. These slugs will be spaced with respect to the same considerations which are observed in obtaining proper arrangement and balance of subject matter upon the sheet, as before explained. Then when the proper arrangement has been obtained for a given sheet, the slugs 14 will here also be employed as straight edges for the ruling of pencil lines along the lower sides thereof so as to thereby indicate upon the topmost sheet 10 the particular arrangement which has been obtained. The slugs may then be removed, and after the various sections of space for the different advertisements upon the sheet have been marked so as to be later identified, the frame 12 will be raised and the topmost sheet 10 turned back so as to occupy a position corresponding to that indicated by reference numeral 1ª in Fig. 1. The same expedient may be employed here also, as explained in connection with Fig. 1, for the purpose of temporarily maintaining the frame 12 in raised position, while turning back the successive sheets from the stack 10.

As above explained, the trial sheets after having indicated upon them the proper arrangement of advertising matter, may be transferred to the news department where they may be employed as a guide to show the news department what space it has available. Then the news department manipulates the slugs on its news sheet so as to properly balance its news items within the space on the page which is left for such items.

The board 11 may be provided with a drawer conveniently located with respect to the make-up frame 12 for the purpose of storing the slugs 14 when not in use. In this case, the compartments in the drawer may be of different sizes according to the various sizes of slugs, as above referred to.

Without disturbing the well-established practice already in vogue in the modern newspaper office with respect to the transferring of test sheets from one department to another and the employment of such information and indications to be obtained therefrom in the final combined arrangement of both advertisements and news items, the present form of device is calculated to contribute very largely to the convenience, accuracy, and speed with which such trial sheets may be made up in both of these two departments. Whereas heretofore there has been required considerable erasure of pencil marks during the process of discovering the best possible arrangement and balance of the items upon a given page, this laborious and comparatively slow process is hereby replaced by the more efficient placing and replacing of the slugs in the make-up frame during the process of discovering the best possible arrangement. With the present invention, not only is the same result obtained as in the old practice, but in a more efficient manner.

What I claim is:

1. A make-up device, comprising an open frame having fixed cross members connecting opposite edges of the frame and forming divisions corresponding only to column divisions of a single page of a newspaper, and rigid means adapted for readily changeable position across said divisions for indicating the variable arrangement of the composition for a single page.

2. A make-up device comprising a dummy frame having fixed dummy columns corresponding only to the columns of a newspaper sheet, and dummy means adapted for readily and individually removable disposition between said columns for indicating within any selected column or columns various arrangements of composition for a sheet.

3. A make-up device comprising a base, an open frame hinged thereto, and having divisions corresponding to the divisions of a single newspaper sheet, said frame being adapted to rest upon a plurality of superposed dummy single sheets, and slugs having means of removable engagement across the divisions of said frame so as to over-lie the topmost of the sheets for indicating thereupon the arrangement of the composition for a sheet, whereby the frame may be readily raised to permit the successive removal of the individual sheets.

4. A make-up device comprising a unitary open frame having bars dividing the same into columns corresponding to the columns of a newspaper sheet, and straight-edge slugs having removable engagement with said bars for insertion at various points across the columns so as to indicate the arrangement of the composition for a sheet, said bars being constructed and arranged to retain the slugs in selected position to permit the marking of their position upon a dummy sheet therebeneath.

5. A make-up device comprising a base, a unitary frame having bars dividing the same into columns corresponding to the columns of a newspaper sheet, hinge means joining said frame to said base for raising movement of the frame in one direction, means for hinging together on said base, beneath said frame, a plurality of superposed dummy newspaper sheets hinged together beneath said from and said sheets being adapted for turning movement in another direction out from under said frame, when in raised position so as to permit the frame to be placed upon successive sheets, and straight edge slugs having removable engagement with said bars for insertion at various points across the columns so as to indicate the arrangement of the composition for a sheet, said slugs being constructed and arranged to permit the marking of their positions upon successive dummy sheets therebeneath.

6. A make-up device comprising a unitary open frame having bars dividing the same into columns corresponding to the columns of a newspaper sheet, said bars having series of oppositely disposed notches, and straight-edge slugs having removable engagement with the notches of said bars for insertion at various points across the columns so as to indicate the arrangement of the composition for a sheet, and to permit the marking of their position upon a dummy sheet therebeneath.

7. A make-up device, comprising an open frame having fixed cross members connecting opposite edges of the frame and forming divisions corresponding only to divisions of a single page of a newspaper, rigid means adapted for readily changeable position across said divisions for indicating the variable arrangement of the composition for a single page, and means provided upon said cross members for showing the number of units to be comprised within said divisions.

SOLOMON GIMPLIN.